US012587311B1

(12) United States Patent
Mohammad

(10) Patent No.: US 12,587,311 B1
(45) Date of Patent: Mar. 24, 2026

(54) CONNECTIVITY CONTROLLER WITH ENHANCED THROUGHPUT IN AN EMBEDDED SYSTEM

(71) Applicant: Synopsys, Inc., Sunnyvale, CA (US)

(72) Inventor: Saleem Chisty Mohammad, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 24 days.

(21) Appl. No.: 18/670,307

(22) Filed: May 21, 2024

(51) Int. Cl.
*H04L 1/00* (2006.01)
(52) U.S. Cl.
CPC .......... *H04L 1/0045* (2013.01); *H04L 1/0061* (2013.01)
(58) Field of Classification Search
CPC .. H03M 13/09; G06F 9/5005; G06F 9/30079; G06F 11/1004; G06T 1/20; H04L 1/0061
See application file for complete search history.

(56) References Cited

U.S. PATENT DOCUMENTS

2017/0308433 A1* 10/2017 Kwon ..................... G11C 29/52
2024/0152484 A1* 5/2024 Jennings ............. G06F 13/4291
2025/0130959 A1* 4/2025 Fukui ........................ G06F 8/61

* cited by examiner

*Primary Examiner* — Thien Nguyen
(74) *Attorney, Agent, or Firm* — Weaver Austin Villeneuve & Sampson LLP

(57) ABSTRACT

A computing system includes, in part, a host controller and a device controller. The host controller is configured to comply with a connectivity standard and includes, in part, a host protocol layer, a host link layer, and a host register. The device controller is configured to communicate with the host controller in conformity with the connectivity standard. The device controller includes, in part, a device protocol layer, a device link layer, and a device register. In response to the device register being set, the device link layer is inhibited from performing an integrity check on a packet received from the host link layer and using a first cyclic redundancy check (CRC) value of the first packet. The CRC value is computed by and disposed in the first packet by the host link layer.

20 Claims, 7 Drawing Sheets

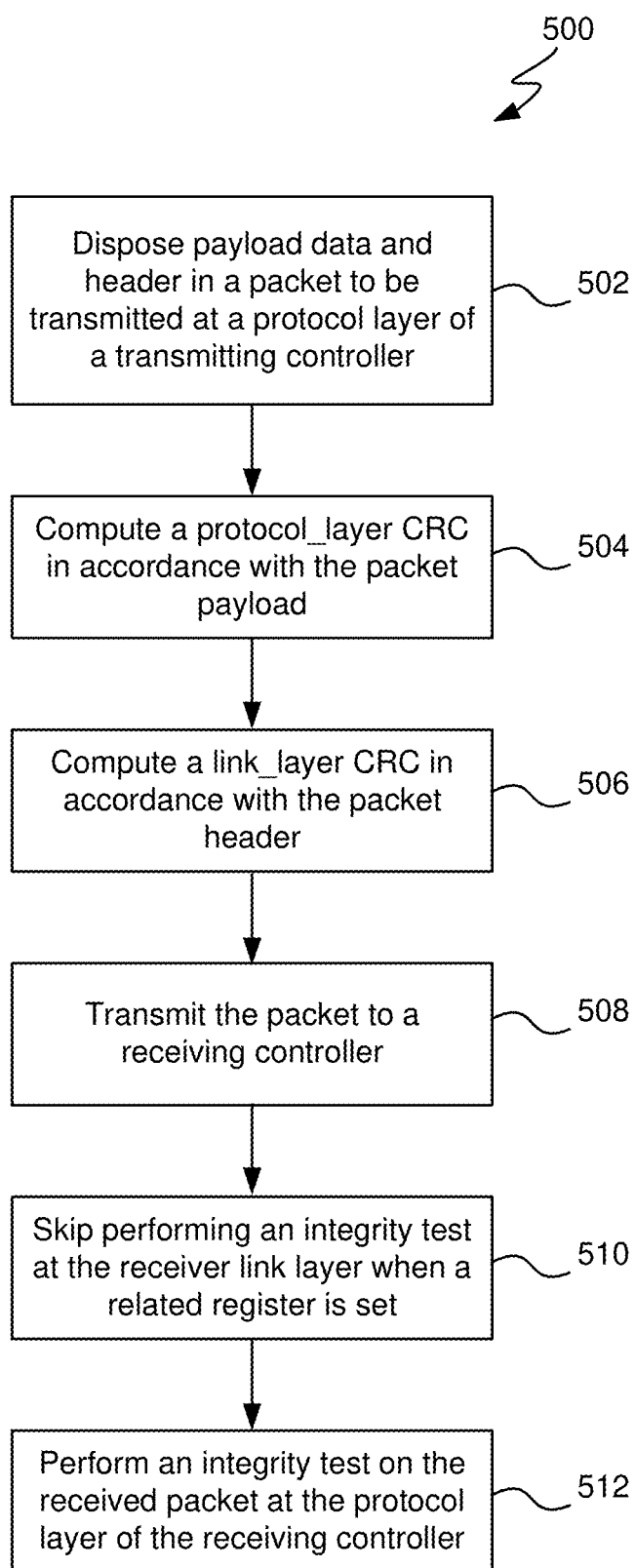

500

Dispose payload data and header in a packet to be transmitted at a protocol layer of a transmitting controller ⎯ 502

Compute a protocol_layer CRC in accordance with the packet payload ⎯ 504

Compute a link_layer CRC in accordance with the packet header ⎯ 506

Transmit the packet to a receiving controller ⎯ 508

Skip performing an integrity test at the receiver link layer when a related register is set ⎯ 510

Perform an integrity test on the received packet at the protocol layer of the receiving controller ⎯ 512

*FIG. 5*

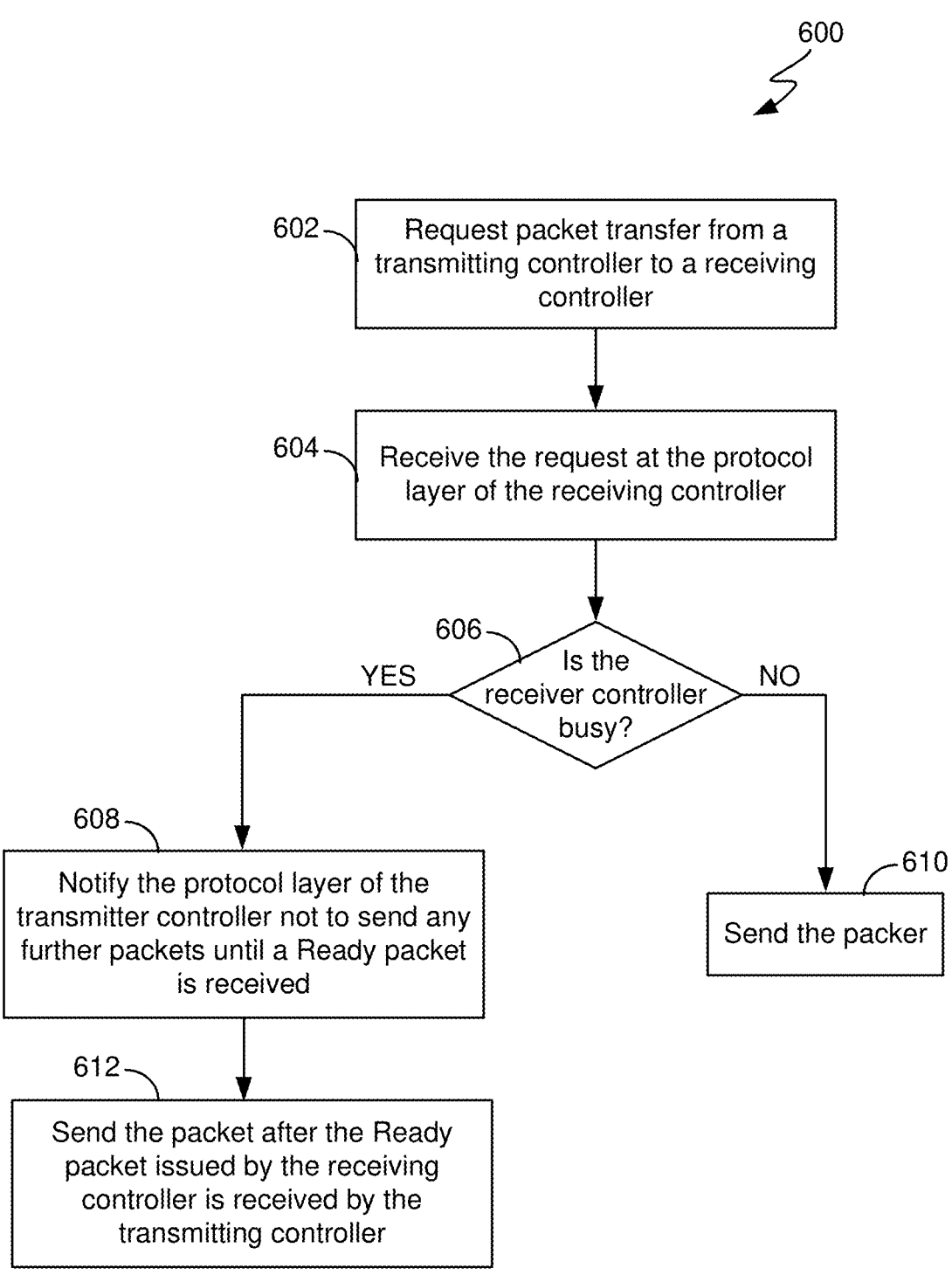

600

602 — Request packet transfer from a transmitting controller to a receiving controller 604 — Receive the request at the protocol layer of the receiving controller 606 — Is the receiver controller busy?

YES

NO

608 — Notify the protocol layer of the transmitter controller not to send any further packets until a Ready packet is received 610 — Send the packer 612 — Send the packet after the Ready packet issued by the receiving controller is received by the transmitting controller

*FIG. 6*

CONNECTIVITY CONTROLLER WITH ENHANCED THROUGHPUT IN AN EMBEDDED SYSTEM

TECHNICAL FIELD

The present application relates to a connectivity controller, and more particularly to enhancing the throughput of a universal serial bus (USB) controller in an embedded system.

BACKGROUND

There has been a rapid and widespread increase in the development of communication and computation technologies, particularly in the capabilities of mobile electronic devices to connect and communicate using a number of different communication protocols and connectors.

One example of a connectivity standard is the USB standard and its variants. In accordance with the USB-3 standard, transmission of packets from, for example, the protocol layer of a host controller to the protocol layer of device controller, is carried out through the link layers and the physical layers of the host controller and the device controller.

BRIEF DESCRIPTION OF DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 is a flowchart for performing an integrity check between a host and a device embedded in the host, in accordance with one embodiment of the present disclosure.

FIG. 6 is a flowchart for controlling the data flow between a host and a device embedded in the host, in accordance with one embodiment of the present disclosure.

DETAILED DESCRIPTION

Aspects of the present disclosure relate to controlling packet transmission between a USB host controller and a USB device controller.

High-speed interconnects are often used to transfer packets from one electronic component or computing/communication device to another. For example, a computing system may be coupled to a number of peripheral devices such as display monitors, auxiliary storage devices, or the like, via one or more high-speed interconnects. Examples of such interconnects are Peripheral Component Interconnect Express (PCIe), and Universal Serial Bus (USB).

Figure 1:
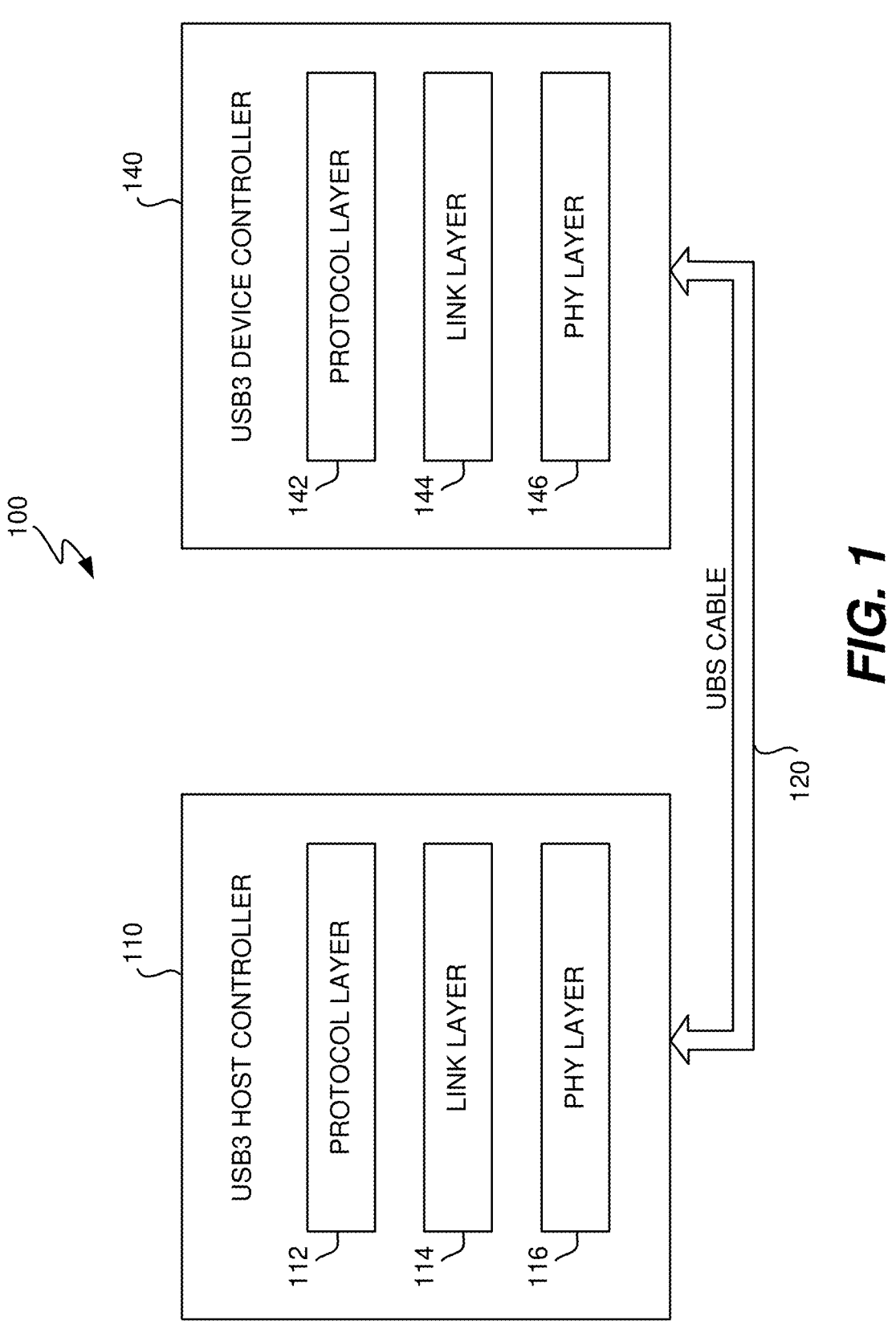
FIG. 1 shows a USB-3 host controller connected to a USB-3 device controller via a USB-3 cable.

FIG. 1 shows a USB-3 host controller 110 connected to a USB-3 device controller 140 via a USB-3 cable 120. USB-3 host controller 110, which may be disposed, for example, in a personal computer is shown as including, in part, a protocol layer 112, a link layer 114, and a physical (PHY) layer 116. Similarly, USB-3 device controller 140, which may be disposed, for example, in a mobile phone is shown as including, in part, a protocol layer 142, a link layer 144, and a physical (PHY) layer 146. Host controller 110 and device controller 140 conform with the USB-3 standard and communicate via USB-3 cable 120.

The protocol layers are configured, in part, to issue requests for packet transmission either from the host controller to the device controller, or from the device controller to the host controller. The protocol layers are further configured, in part, to (i) generate and transmit packets in accordance with the USB-3 standard, and (ii) ensure that the received packets meet the required integrity checks and thus are free of errors.

The link layers are configured, in part, to maintain the reliability and integrity of the traffic flow between their associated controllers. Each link layer is configured to compute a 16-bit cyclic redundancy check (CRC) value for a packet to be transmitted by the link layer's associated PHY layer. The link layer of the controller receiving the packets uses the 16-bit CRC value to perform an integrity test on the received packet to ensure that the packet's payload has not been corrupted. The controller transmitting a packet is referred to herein as the transmitting controller, and the controller receiving the packet is referred to herein as the receiving controller.

The PHY layers represent the physical connection between the two controllers. The PHY layer of the transmitting controller, in part, receives data from the associated link layer, scrambles the data to reduce electro-magnetic interference, encodes the scrambled data into symbols, and serializes the data to be sent over USB-3 cable 120. The PHY layer of the receiving controller performs, in part, de-serialization, decoding, descrambling, and data recovery. The PHY layers are also configured to detect errors caused by the USB-3 cable 120, such as cable-induced distortion, attenuation, and noise interference.

Figure 2:
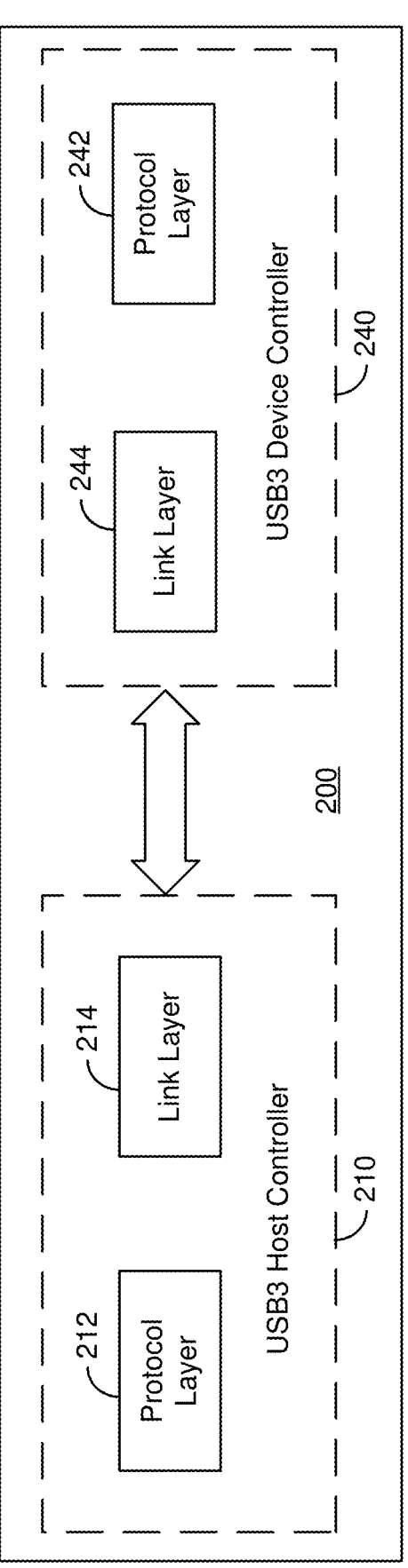
FIG. 2 shows a host that includes a USB-3 host controller and a USB-3 device controller.

FIG. 2 shows a USB-3 host controller 210 of a computing/communications host system/device (alternatively referred to herein as host) 200 embedded in which is a peripheral device having USB-3 controller 240. The embedded peripheral device (alternatively referred to herein as device) may be, for example, a camera, a speaker, a storage or any other peripheral device that may be embedded in host 200. Because the device is embedded device in the host, no PHY layer is required to transfer data between the host and the device. Accordingly, communications between the host and the device is carried out via the protocol layer 212 and link layer 214 of controller 210 of the host, and protocol layer 242 and link layer 244 of controller 240 of the device. As described above, in accordance with the USB-3 standard, both protocol layers 212, 242, as well as link layers 214, 244 perform link/data integrity checks, thus resulting in data integrity verification redundancy.

Embodiments of the present disclosure benefit from the integrity and error detection checks carried out at the protocol layers to avoid the redundancy of performing similar checks at the link layers, thus advantageously freeing up the bandwidth, that would have been otherwise used to perform integrity checks at the link layer, to transfer data. Technical advantages of the present disclosure thus include an increase in the throughput of the connection established between a host and a device to transmit data.

To achieve the above advantages, in one embodiment, the link layer in each of the host controller and the device controller is configured to include a register. When the register disposed in the device link layer is set (e.g., to a logic 1), no integrity check is performed by the device link layer on packets received from the host. Similarly, when the register disposed in the host link layer is set, no integrity check is performed by the host link layer on packets received from the device. The following description of the embodiments of the present disclosure is provided with reference to a USB-3 standard. It is understood, however, that embodiments of the present disclosure apply to all versions of the USB-3 standard, e.g., USB-3.1 and USB-3.2, including any other communications or connectivity standard, existing or developed in the future.

Figure 3A:
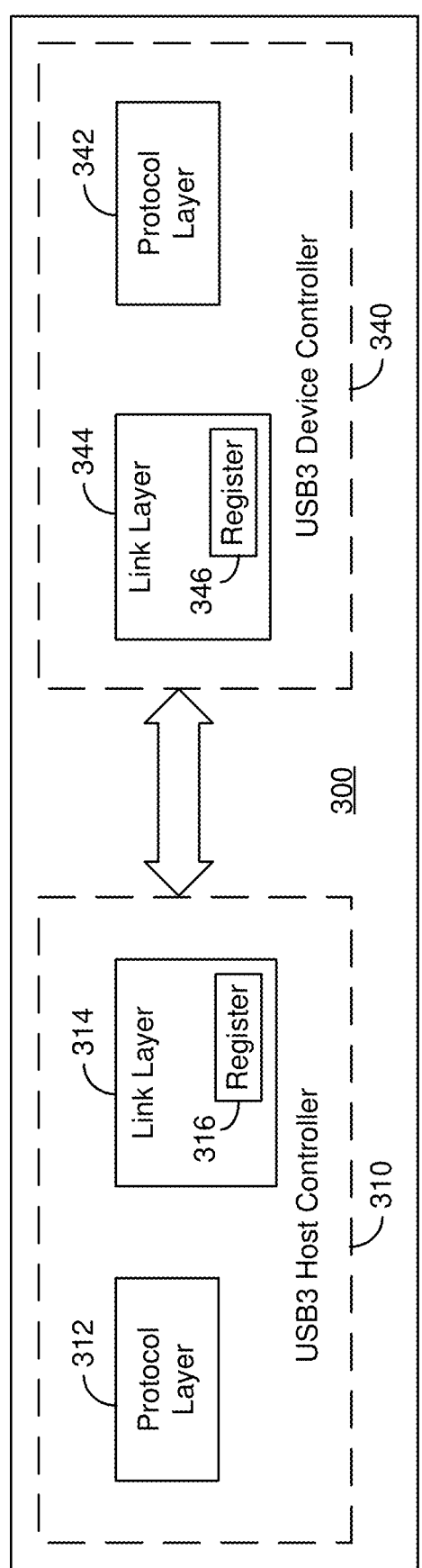
FIG. 3A shows a host that includes a USB-3 host controller and a USB-3 device controller, in accordance with one embodiment of the present disclosure.

FIG. 3A shows a USB-3 host controller 310 of a host 300 in communication with a USB-3 device controller 340 of a device (not shown) embedded in host 300. The embedded device may be a camera, speaker, or any other peripheral device embedded in host 300 and configured to communicate with host controller 310 using a USB-3 communications standard/protocol. Host 300 may be a desktop computer, a laptop computer, a server, or any other computing/communication system with a USB-3 controller.

Because the device is embedded in the host, no PHY layer is used to transfer data between the host and the device. Accordingly, communications between the host and the device is carried out via protocol layer 312 and link layer 314 of USB-3 controller 310 of the host, and protocol layer 342 and link layer 344 of USB-3 controller 340 of the device. Link layer 314 is shown as including a register 316, and link layer 344 is shown as including a register 346. Registers 316 and 346 are set to a fixed value (e.g., logic 1) prior to any operation. In accordance with embodiments of the present disclosure, packets transferred between the host controller and the device controller are only checked for integrity at the protocol layers 312 and 342. Therefore, link layers 342 and 344 are inhibited from performing data integrity checks.

Data flow between the two controllers are initiated by host controller 310. Assume host controller 310 is instructed by an application to transfer data from the host to the device. In response, protocol layer 312 forms one or more packets by, in part, disposing the requested data in the payload field of the packets, computing an associated 32-bit protocol layer cyclic redundancy check (CRC) from the payload disposed in each packet, inserting the computed CRC in each associated packet, and transferring the packets to link layer 314.

Link layer 314 receives the packets delivered thereto by protocol layer 312, computes a 16-bit link layer CRC value (which is different from the 32-bit CRC computed by protocol layer 312) and other USB-3 required fields (such as the "link control word") for each such packet, and adds the 16-bit CRC as well as, e.g., the link-control word, to the received packets. Thereafter, link layer 314 transmits the packets to link layer 344 of the device.

Prior to processing the packets received from link layer 314, link layer 344 checks the status of register 346 to determine whether register 346 is set. Because register 346 is set, link layer 344 is inhibited from performing data integrity test on the received packets using the 16-bit link-layer CRC values computed by link layer 314. Link layer 344 forwards the received packets to protocol layer 342 after performing other operations specified by the USB-3 standard. Protocol layer 342 performs data integrity test on the received packets using the 32-bit CRC value disposed in the packets by protocol layer 312 to determine whether the received packets are error free.

Data transfer from the device to the host is carried out in a similar manner. Assume that the host requests data to be transferred from the device to the host. In response, protocol layer 342 forms one or more packets by, in part, disposing the requested data in the payload field of the packets, computing an associated 32-bit protocol layer CRC from the payload data for each packet, inserting the computed CRC in each such associated packet, and transferring the packets to link layer 344.

Link layer 344 receives the packets delivered thereto by protocol layer 342, computes a 16-bit link layer CRC value and other USB-3 required fields (such as the "link control word") for each such packet, and adds the 16-bit CRC as well as, e.g., the link-control word, to the received packets. Thereafter, link layer 344 transmits the packets to link layer 314 of the host.

Prior to processing the packets received from link layer 344, link layer 314 checks the status of register 316 to determine whether register 316 is set. Because register 316 is set, link layer 314 is inhibited from performing data integrity test on the received packets using the 16-bit link-layer CRC values computed by link layer 344. Link layer 314 forwards the received packets to protocol layer 312 after performing other operations specified by the USB-3 standard. Protocol layer 312 performs data integrity test on the received packets using the 32-bit CRC value disposed in the packets by protocol layer 342 to determine whether the received packets are error free.

Figure 3B:
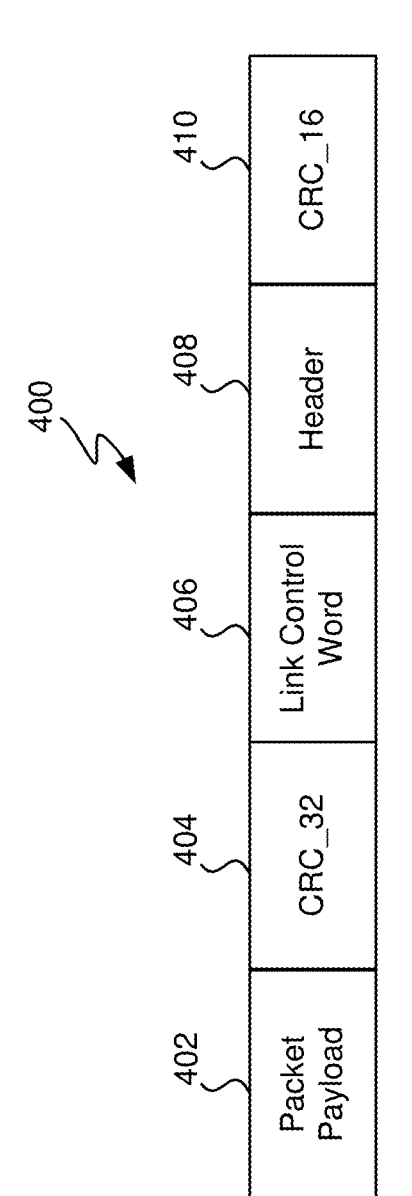
FIG. 3B shows a number of fields of a USB-3 packet.

FIG. 3B shows a number of fields of a USB-3 packet 400. It is understood that a USB-3 packet includes a number of other fields that are not shown in FIG. 3B for simplicity. Packet 400 is shown as including, in part, a data payload field 402 in which the requested data is disposed by the protocol layer, a 32-bit CRC field 404 computed from the data payload by the protocol layer, a link control word field 406 in which link control bits are disposed by the link layer, a packet header field 408 in which packet header is disposed by the protocol layer, and a 16-bit CRC field 406 computed by the link layer, in part, from the payload field 402 and header field 408.

Referring to FIGS. 3A and 3B concurrently, as was described above, in accordance with embodiments of the present disclosure, when the registers 316 is set, link layer 314 is inhibited from performing data integrity test using the 16-bit CRC field 406 computed by link layer 344. Similarly, when the registers 346 is set, link layer 344 is inhibited from performing data integrity test using the 16-bit CRC field 406 computed by link layer 314. Instead, embodiments of the present disclosure use the data integrity tests performed at the protocol layer of the receiving controller based on the 32-bit CRC field 404 disposed in the packet by the protocol layer of the transmitting controller to check for any errors that may have occurred during transmission of the packets. By inhibiting data integrity tests at the link layers of the controllers receiving the packets, the throughput of the communications link between the transmitting and receiving controllers is enhanced.

In accordance with another aspect of the present disclosure, data flow control between the transmitting controller and the receiving controller is also performed at the protocol layers and not at the link layers. In other words, the link layer is inhibited from performing link layer flow control, as is otherwise required by the USB-3 standard.

The flow control is based upon a credit mechanism. When the device controller link layer is busy and unable to process the incoming requests from the host controller at the rate the requests arrive, the transmitting controller is instructed not to send any further packets and wait for permission before retransmitting the packets. Such permissions are referred to in the USB-3 standard as credits. Each credit corresponds to a permission to transmit one packet. Each controller maintains a credit counter which is incremented each time a credit is issued and decremented each time a packet is transmitted. If the number of credits exceeds 4, then, for example, the host controller will stop sending any further requests to the device controller.

Referring to FIG. 3A, in accordance with embodiments of the present disclosure, when register 316 is set, host controller 310 does not issue credits (i.e., inhibited from issuing credits), and furthermore, host controller 310 does not wait (i.e., inhibited from waiting) for credits to be issued by device controller 340 in order to transmit packets to device controller 340. Similarly, when register 346 is set, device controller 340 does not issue credits, and furthermore, device controller 340 does not wait for credits to be issued by host controller 310 in order to transmit packets to host controller 310. Accordingly, both the host controller and device controller are aware that no credit exchange is required for packet transmission.

If the device controller is busy and unable to receive and process packets from the host controller, the protocol layer of the device controller sends a packet to the host controller to notify the host controller that the device controller is not ready to receive packets. The cessation in transmission of the packets from the host controller to the device controller is terminated when the protocol layer of the device controller subsequently sends a "ready" packet, as defined in the USB-3 standard, to the host controller to notify the host controller that the device controller is ready to receive further packets. Consequently, in accordance with embodiments of the present disclosure, the link layer flow control is disabled by setting registers 316 and 346. Instead, the flow control is performed by the protocol layers. By not performing flow control via credit commands at the link layers, the throughput of the communications link between the transmitting and receiving controller is further enhanced, in accordance with embodiments of the present disclosure.

Figures 4A, 4B:
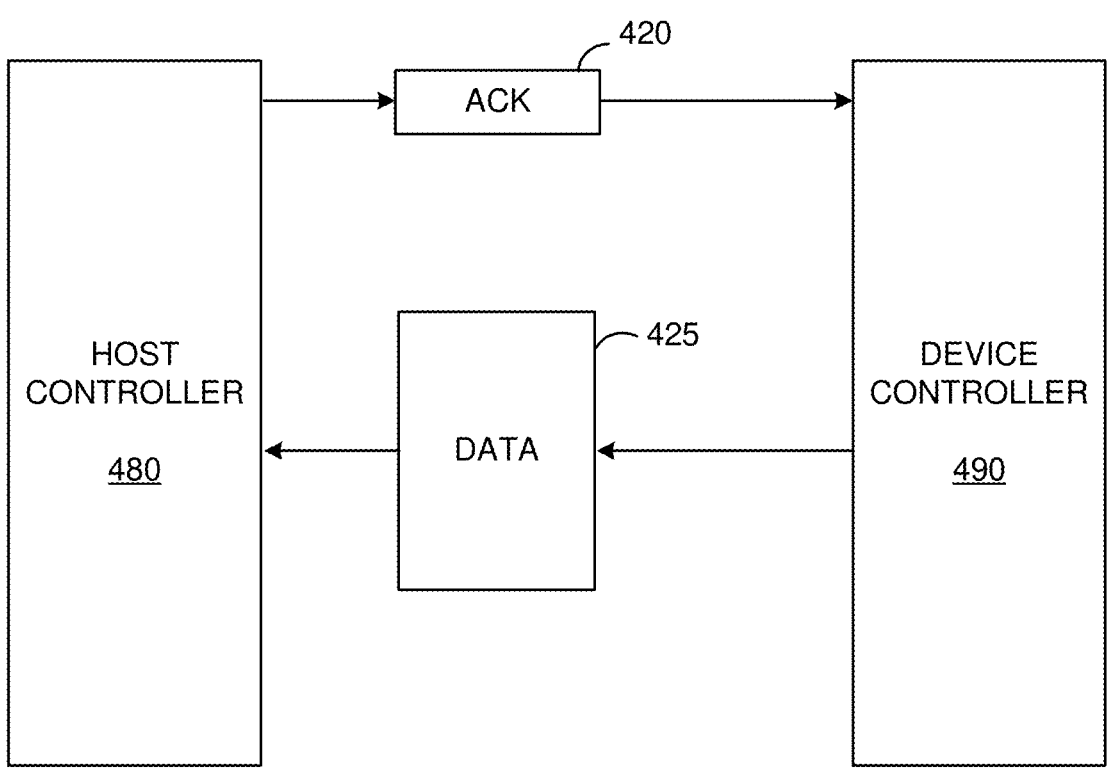
FIG. 4A shows a number of exchanges between a host controller and a device controller in order to transfer a packet using a typical process.
FIG. 4B shows a number of exchanges between a host controller and a device controller in order to transfer a packet in accordance with embodiment of the present disclosure.

FIG. 4A shows a number of exchanges between a host controller 410 and a device controller 440 in order to transfer a packet from the device controller to the host controller using a typical process. After receiving the acknowledgement (ACK) header packet 420 from the host controller in response to a request for data transfer, the link layer (not shown in FIG. 4A) of the device controller checks the integrity of the header packet, and issues a "good header" command "LGOODn" 424 to the link layer (not shown in FIG. 4A) of the host controller. After the ACK header packet 420 is provided to the protocol layer (not shown in FIG. 4A) of the device controller, the link layer of the device controller issues a credit packet "LCRDx" 424 to the link layer of the host controller. After receiving the ACK header packet, the protocol layer of the device controller transfers data packet 425 to the protocol layer of the host controller. After receiving the data packet, the link layer of the host controller checks the integrity of the header and issues a "good header" command "LGOODn" 428 to the link layer of the device controller. After the data packet is provided to the protocol layer of the host controller, the link layer of the host controller issues a credit packet "LCRDx" 430 to the link layer of the device controller.

FIG. 4B a number of exchanges between a host controller 480 and a device controller 490 in order to transfer a packet from the device controller to the host controller in accordance with one embodiment of the present disclosure. As is seen from FIG. 4B, transfer of the data packet 425 between the device controller and the host controller occurs using ACK header packet 420. Therefore, in accordance with embodiments of the present disclosure, the link layer commands, i.e., LGOODn 420, LCRDx 424, LGOODn 428 and LCRDx 430 shown in FIG. 4A, are advantageously not exchanged in embodiments of the present disclosure. The bandwidth that would have otherwise been consumed by the link layer commands is thus freed up and used by the protocol layers to transfer more packets, thereby enhancing the throughput in accordance with embodiments of the present disclosure.

FIG. 5 is a flowchart 500 for performing integrity check between a host and a device embedded in the host, in accordance with one embodiment of the present disclosure. At 502, at the protocol layer of the transmitting controller, the payload data and header information is disposed in the packet to be transmitted. At 504, the protocol layer computes a protocol-layer CRC value in accordance with the packet payload and disposes the CRC value in the packet. At 506, after receiving the packet from the protocol layer, the link layer computes a link-layer CRC in accordance with, in part, the packer payload and packet header, and disposes the link-layer CRC in the packet. At 508, the link layer transmits the packet to the link layer of the receiving controller. At 510, the link layer performs the link-layer related operations without performing an integrity check. At 512, the protocol layer of the receiving controller performs an integrity check on the received packet in accordance with the protocol-layer CRC value computed by the protocol layer of the transmitting controller.

FIG. 6 is a flowchart 600 for controlling data flow between a host and a device embedded in the host, in accordance with one embodiment of the present disclosure. At 602, a request for data transfer in the form of packets is made by a transmitting controller to a receiving controller. At 604, the request for the data transfer is received at the protocol layer of the receiving controller. If the receiving controller is determined to be busy at 606, the protocol layer of the receiving controller sends a packet at 608 to the protocol layer of the transmitting controller to notify the protocol layer of the transmitting controller not to send any further packets until the protocol layer of the transmitting controller receives a ready packet from the protocol layer of the receiving controller. At 612, after receiving the ready packet issued by the receiving controller, the transmitting controller sends the packet to the receiving controller. If the receiving controller is determined not to be busy at 606, the transmitting controller sends the packet to the receiving controller at 610.

A computing system, in accordance with one embodiment of the present disclosure, includes, in part, a host controller and a device controller. The host controller is configured to comply with a connectivity standard and includes, in part, a host protocol layer; a host link layer; and a host register. The device controller is configured to communicate with the host controller in conformity with the connectivity standard. The device controller includes, in part, a device protocol layer; a device link layer; and a device register. In response to the device register being set, the device link layer is inhibited from performing an integrity check on a first packet received from the host link layer and using a first cyclic redundancy check (CRC) value of the first packet. The CRC value is computed by and disposed in the first packet by the host link layer.

In one embodiment, in response to the host register being set, the host link layer is inhibited from performing an integrity check on a second packet received from the device link layer and using a CRC value of the second packet. The CRC value of the second packet is computed by and disposed in the second packet by the device link layer.

In one embodiment, the connectivity standard is the USB-3 standard. In one embodiment, in response to the device register being set, the device link layer is inhibited from issuing a USB-3 credit command to the host controller when the device controller is requested to receive a third packet from the host controller. In one embodiment, in response to the host register being set, the host link layer is inhibited from issuing a USB-3 credit command to the device controller when the host controller is requested to receive a fourth packet from the device controller.

In one embodiment, in response to the host register being set, the host link layer is inhibited from waiting for a USB-3 credit command from the device controller to transmit a fifth packet to the device controller. In one embodiment, in response to the device register being set, the device link layer is inhibited from waiting for a USB-3 credit command from the host controller to transmit a sixth packet to the host controller. In one embodiment, each of the host register and the device register is a 1-bit register.

A method of transmitting packets between a host controller of a computing system and a device controller of a device embedded in the computing system, in which the host controller includes a host protocol layer and a host link layer, in which the device controller includes a device protocol layer and a device link layer, and in which the device is configured to communicate with the host in conformity with a connectivity standard, includes, in part, setting a host register disposed in the host link layer; setting a device register disposed in the device link layer; and inhibiting, by a processor and in response to setting of the device register, the device link layer from performing an integrity check on a first packet received from the host link layer and using a first cyclic redundancy check (CRC) value of the first packet. The CRC value is computed by and disposed in the first packet by the host link layer.

In one embodiment, the method further includes, in part, inhibiting, in response to setting of the host register, the host link layer from performing an integrity check on a second packet received from the device link layer and using a CRC value of the second packet. The CRC value of the second packet is computed by and disposed in the second packet by the device link layer. In one embodiment, the connectivity standard is the USB-3 standard.

In one embodiment, the method further includes, in part, inhibiting, in response to setting of the device register, the device link layer from issuing a USB-3 credit command to the host controller when the device controller is requested to receive a third packet from the host controller. In one embodiment, the method further includes, in part, inhibiting, in response to setting of the host register, the host link layer from issuing a USB-3 credit command to the device controller when the host controller is requested to receive a fourth packet from the device controller.

In one embodiment, the method further includes, in part, inhibiting, in response to the setting of the host register, the host link layer from waiting for a USB-3 credit command from the device controller to transmit a fifth packet to the device controller. In one embodiment, the method further includes, in part, inhibiting, in response to the setting of the device register, the device link layer from waiting for a USB-3 credit command from the host controller to transmit a sixth packet to the host controller.

A non-transitory computer readable medium comprising stored instructions, which when executed by a processor, cause the processor to set a host register disposed in a host controller of a computing system, wherein the host controller comprises a host protocol layer and a host link layer. The instructions further cause the processor to set a device register disposed in a device controller embedded in the computing system, wherein the device controller comprises a device protocol layer and a device link layer, and wherein the host controller and the device controller are configured to communicate in conformity with a connectivity standard. The instructions further cause the processor to inhibit, in response to setting of the device register, the device link layer from performing an integrity check on a first packet received from the host link layer and using a first cyclic redundancy check (CRC) value of the first packet. The CRC value is computed by and disposed in the first packet by the host link layer.

In one embodiment, the instructions further cause the processor to inhibit, in response to setting of the host register, the host link layer from performing an integrity check on a second packet received from the device link layer and using a CRC value of the second packet. The CRC value of the second packet is computed by and disposed in the second packet by the device link layer. In one embodiment, the connectivity standard is the USB-3 standard.

In one embodiment, the instructions further cause the processor to inhibit, in response to setting of the device register, the device link layer from issuing a USB-3 credit command to the host controller when the device controller is requested to receive a third packet from the host controller. In one embodiment, the instructions further cause the processor to inhibit, in response to setting of the host register, the host link layer from issuing a USB-3 credit command to the device controller when the host controller is requested to receive a fourth packet from the device controller.

In one embodiment, the instructions further cause the processor to inhibit, in response to the setting of the host register, the host link layer from waiting for a USB-3 credit command from the device controller to transmit a fifth packet to the device controller. In one embodiment, the instructions further cause the processor to inhibit, in response to the setting of the device register, the device link layer from waiting for a USB-3 credit command from the host controller to transmit a sixth packet to the host controller.

Figure 7:
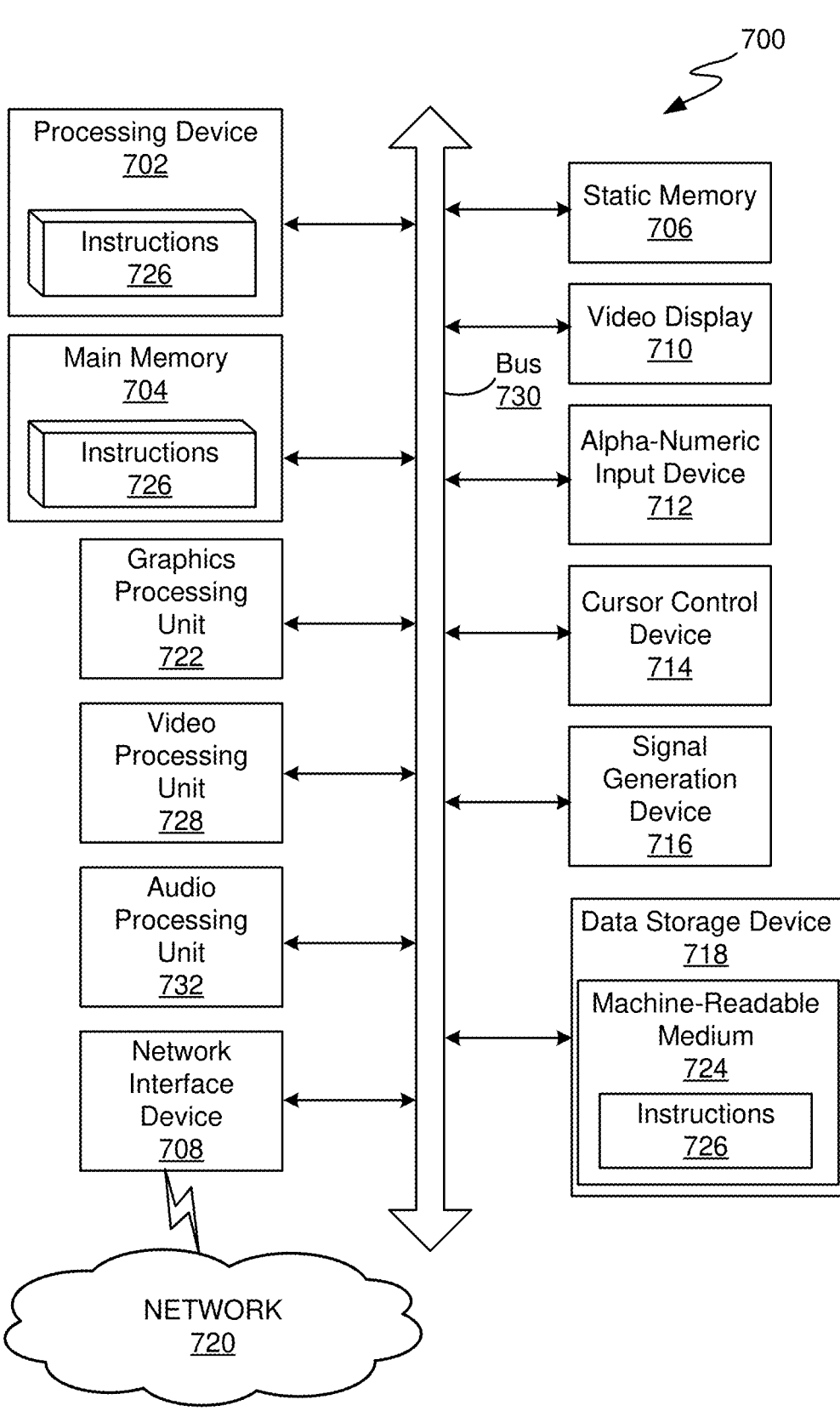
FIG. 7 depicts an example of a computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

What is claimed:

1. A computing system comprising:
a host controller configured to comply with a connectivity standard, the host controller comprising:

a host protocol layer;

a host link layer; and a host register; and a device controller configured to communicate with the host controller in conformity with the connectivity standard, the device controller comprising:

a device protocol layer;

a device link layer; and a device register, wherein in response to the device register being set, the device link layer is inhibited from performing an integrity check on a first packet received from the host link layer and using a first cyclic redundancy check (CRC) value of the first packet, wherein the CRC value is computed by and disposed in the first packet by the host link layer, and wherein in response to the device register being set, the device protocol layer performs the integrity check on the first packet.

2. The computing system of claim 1, wherein in response to the host register being set, the host link layer is inhibited from performing an integrity check on a second packet received from the device link layer and using a CRC value of the second packet, wherein the CRC value of the second packet is computed by and disposed in the second packet by the device link layer.

3. The computing system of claim 2, wherein the connectivity standard is the USB-3 standard.

4. The computing system of claim 3, wherein in response to the device register being set, the device link layer is inhibited from issuing a USB-3 credit command to the host controller when the device controller is requested to receive a third packet from the host controller.

5. The computing system of claim 4, wherein in response to the host register being set, the host link layer is inhibited from issuing a USB-3 credit command to the device controller when the host controller is requested to receive a fourth packet from the device controller.

6. The computing system of claim 5, wherein in response to the host register being set, the host link layer is inhibited from waiting for a USB-3 credit command from the device controller to transmit a fifth packet to the device controller.

7. The computing system of claim 6, wherein in response to the device register being set, the device link layer is inhibited from waiting for a USB-3 credit command from the host controller to transmit a sixth packet to the host controller.

8. The computing system of claim 1 wherein each of the host register and the device register is a 1-bit register.

9. A method of transmitting packets between a host controller of a computing system and a device controller of a device embedded in the computing system, wherein the host controller includes a host protocol layer and a host link layer, and wherein the device controller includes a device protocol layer and a device link layer, wherein the device is configured to communicate with the host in conformity with a connectivity standard, the method comprising:

setting a host register disposed in the host link layer;

setting a device register disposed in the device link layer;

inhibiting, by a processor, in response to setting of the device register, the device link layer from performing an integrity check on a first packet received from the host link layer and using a first cyclic redundancy check (CRC) value of the first packet, wherein the CRC value is computed by and disposed in the first packet by the host link layer; and invoking, in response to the device register being set, the device protocol layer to perform the integrity check on the first packet.

10. The method of claim 9 further comprising:

inhibiting, in response to setting of the host register, the host link layer from performing an integrity check on a second packet received from the device link layer and using a CRC value of the second packet, wherein the CRC value of the second packet is computed by and disposed in the second packet by the device link layer.

11. The method of claim 10, wherein the connectivity standard is the USB-3 standard.

12. The method of claim 11 further comprising:

inhibiting, in response to setting of the device register, the device link layer from issuing a USB-3 credit command to the host controller when the device controller is requested to receive a third packet from the host controller.

13. The method of claim 12 further comprising:

inhibiting, in response to setting of the host register, the host link layer from issuing a USB-3 credit command to the device controller when the host controller is requested to receive a fourth packet from the device controller.

14. The method of claim 13 further comprising:

inhibiting, in response to the setting of the host register, the host link layer from waiting for a USB-3 credit command from the device controller to transmit a fifth packet to the device controller.

15. The method of claim 14 further comprising:

inhibiting, in response to the setting of the device register, the device link layer from waiting for a USB-3 credit command from the host controller to transmit a sixth packet to the host controller.

16. A non-transitory computer readable medium comprising stored instructions, which when executed by a processor, cause the processor to:

set a host register disposed in a host controller of a computing system, wherein the host controller comprises a host protocol layer and a host link layer;

set a device register disposed in a device controller embedded in the computing system, wherein the device controller comprises a device protocol layer and a device link layer, and wherein the host controller and the device controller are configured to communicate in conformity with a connectivity standard;

inhibit, in response to setting of the device register, the device link layer from performing an integrity check on a first packet received from the host link layer and using a first cyclic redundancy check (CRC) value of the first packet, wherein the CRC value is computed by and disposed in the first packet by the host link layer; and invoke, in response to the device register being set, the device protocol layer to perform the integrity check on the first packet.

17. The non-transitory computer readable medium of claim 16, wherein the instructions further cause the processor to:

inhibit, in response to setting of the host register, the host link layer from performing an integrity check on a second packet received from the device link layer and using a CRC value of the second packet, wherein the CRC value of the second packet is computed by and disposed in the second packet by the device link layer.

18. The non-transitory computer readable medium of claim 17, wherein the connectivity standard is the USB-3 standard.

19. The non-transitory computer readable medium of claim 18 wherein the instructions further cause the processor to:

inhibit, in response to setting of the device register, the device link layer from issuing a USB-3 credit command to the host controller when the device controller is requested to receive a third packet from the host controller; and inhibit, in response to setting of the host register, the host link layer from issuing a USB-3 credit command to the device controller when the host controller is requested to receive a fourth packet from the device controller.

20. The non-transitory computer readable medium of claim 19 wherein the instructions further cause the processor to:

inhibit, in response to the setting of the host register, the host link layer from waiting for a USB-3 credit command from the device controller to transmit a fifth packet to the device controller; and inhibit, in response to the setting of the device register, the device link layer from waiting for a USB-3 credit command from the host controller to transmit a sixth packet to the host controller.

* * * * *